Figure 9:
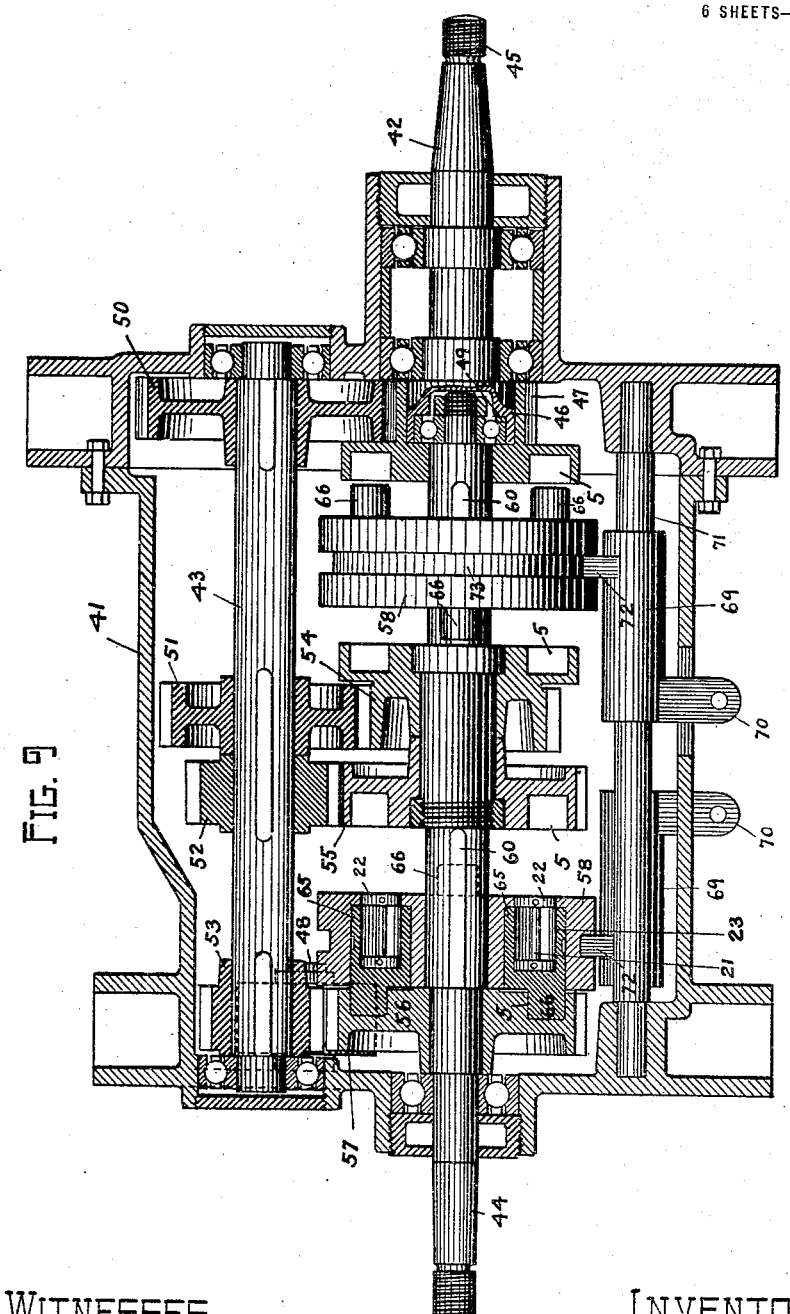

G. A. PETERSON.
POSITIVE CLUTCH.
APPLICATION FILED MAR. 15, 1915.
1,177,583.
Patented Mar. 28, 1916.
6 SHEETS—SHEET 1.
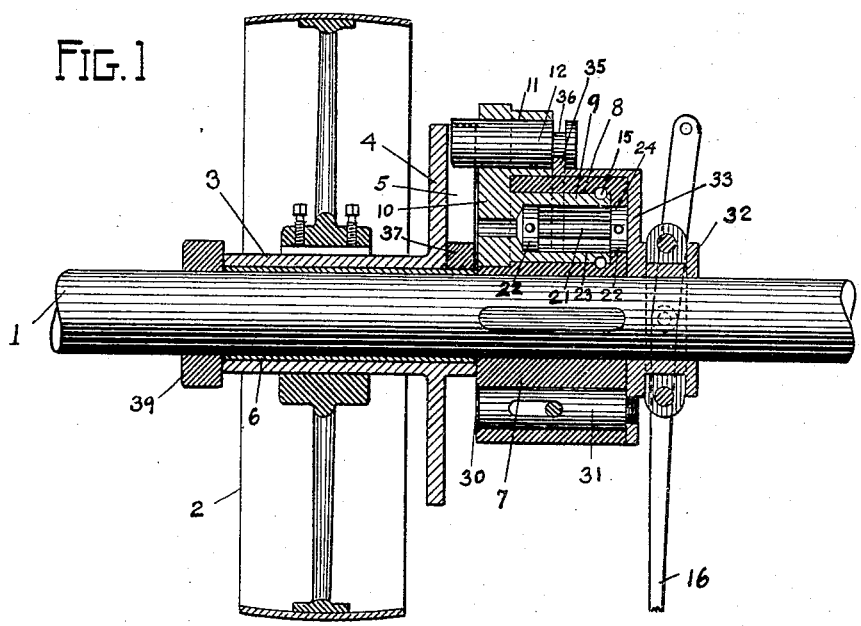
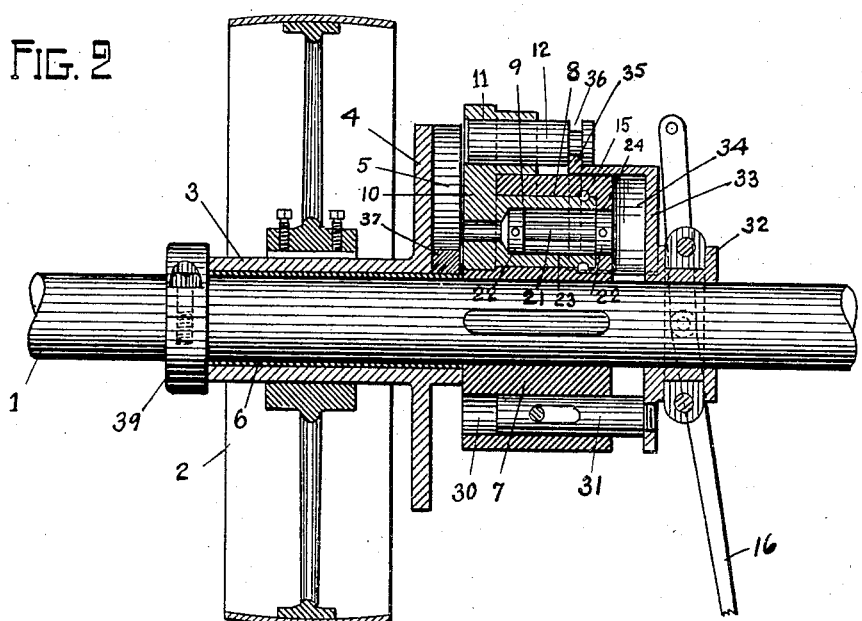
WITNESSES
James Parker
L. H. D. Roylance
INVENTOR
George A. Peterson
By Marcus S. Levé
his Attorney G. A. PETERSON.
POSITIVE CLUTCH.
APPLICATION FILED MAR. 15, 1915.
1,177,583.
Patented Mar. 28, 1916.
6 SHEETS—SHEET 2.
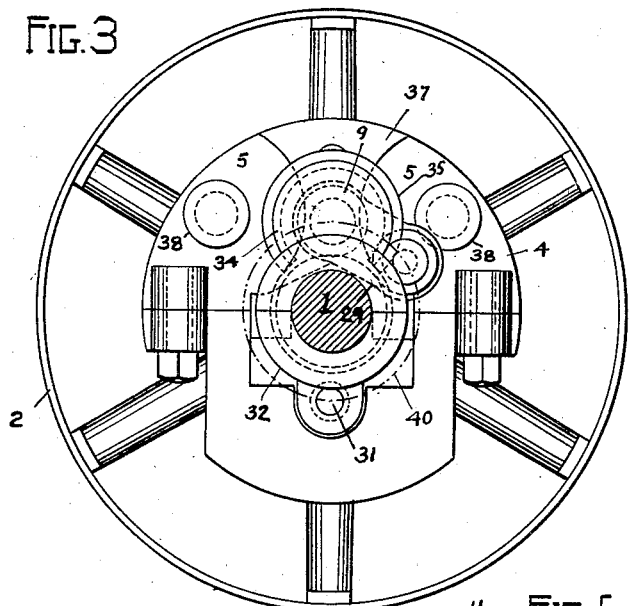
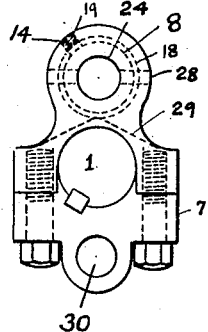
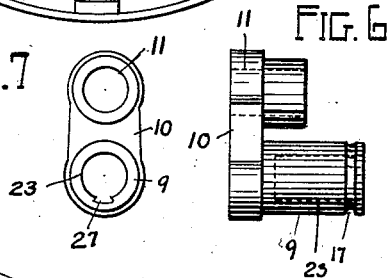
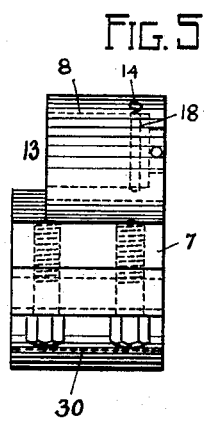
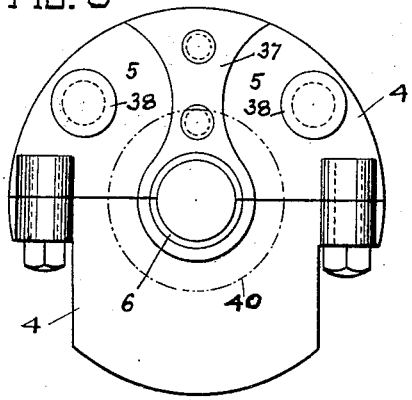
WITNESSES
James Parker
L. H. D. Poylance
INVENTOR
George A. Peterson
By Marcus D. Levi
his Attorney
THE COLUMBIA PLANOGRAPH CO., WASHINGTON, D. C.

G. A. PETERSON.
POSITIVE CLUTCH.
APPLICATION FILED MAR. 15, 1915.

1,177,583.

Patented Mar. 28, 1916.
6 SHEETS—SHEET 4.

WITNESSES

INVENTOR
George A. Peterson
By Marcus S. Leslie
his Attorney

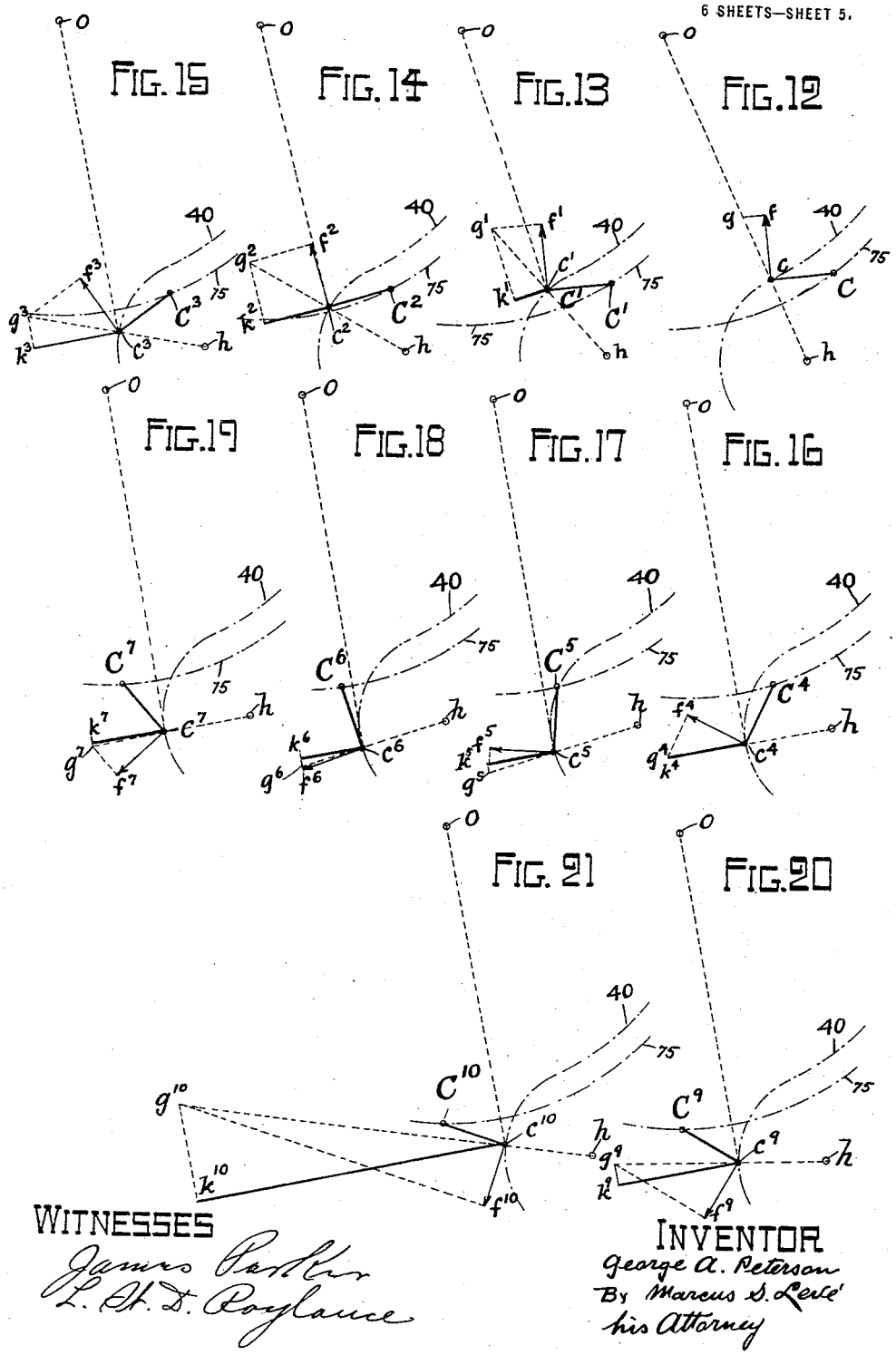

G. A. PETERSON.
POSITIVE CLUTCH.
APPLICATION FILED MAR. 15, 1915.

1,177,583.

Patented Mar. 28, 1916.
6 SHEETS—SHEET 6.

WITNESSES
James Carter
L. H. D. Poylance

INVENTOR
George A. Peterson
By Marcus S. Levi
his Attorney

UNITED STATES PATENT OFFICE.

GEORGE A. PETERSON, OF OAKLAND, CALIFORNIA.

POSITIVE CLUTCH.

1,177,583.     Specification of Letters Patent.   Patented Mar. 28, 1916.

Application filed March 15, 1915. Serial No. 14,416.

*To all whom it may concern:*

Be it known that I, GEORGE A. PETERSON, a citizen of the United States, residing at Oakland, in the county of Alameda and State of California, have invented a new and useful Positive Clutch, of which the following is a specification.

My invention relates to the class of clutches which are placed between a revolving and a stationary member for the purpose of coupling them together and thus cause the stationary member to turn in unison with the said revolving member or to cause the said revolving member to come to rest; and the object of this invention is to provide a clutch which will form a positive engagement between the connected parts, when the motion is in one direction, as well as when it is in the opposite direction, and at the same time have the facility of absorbing the shock due to the sudden starting or the sudden stopping of the machine. With this object in view I provide one of the members with one or more curved engaging grooves or races, which are formed so as to run part of the way concentric with the center of rotation of the revolving member and for the rest of the distance to run on a line deviating in a radial direction. I further provide the other member with one or more cranks or eccentrics fitted to turn inside proper seats and held by springs against stops adapted to keep normally the crank pins at such a distance from the center of rotation as to come opposite the concentric portion of the engaging grooves carried by the first member; and I provide means for sliding the crank pins or for sliding the grooves so as to bring them closer together at one time, thus causing them to engage one another so as to have both of them run in unison, or have both of them brought to rest. The grooves are so arranged as to act upon the cranks while starting or stopping the said driven member and cause them to turn in their seats against the action of the springs in order to reduce the shock due to the starting or stopping of the moving parts.

Figure 10:
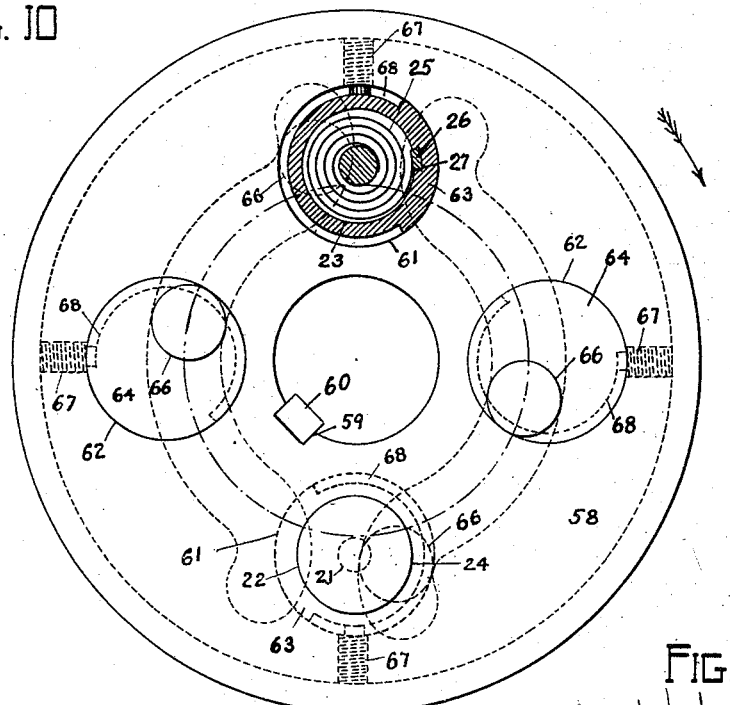
Figure 11:
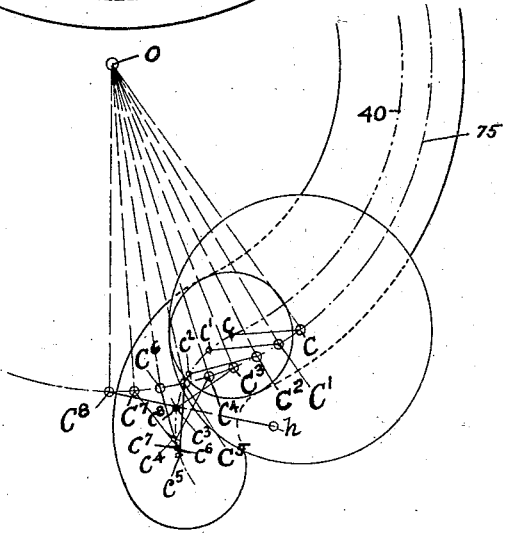
Figure 22:
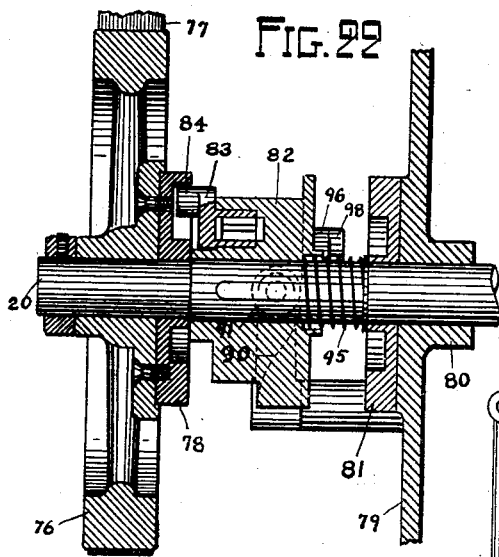
Figure 23:
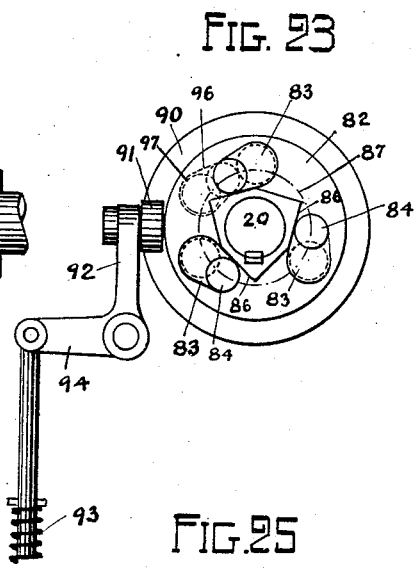
Figure 24:
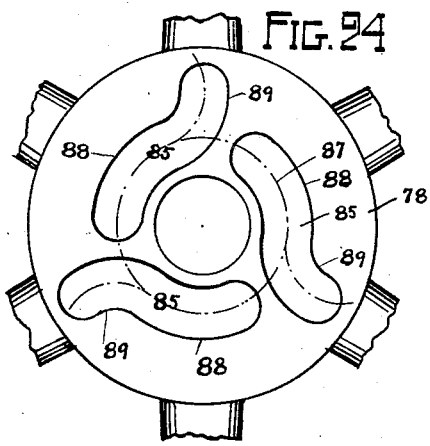
Figure 25:
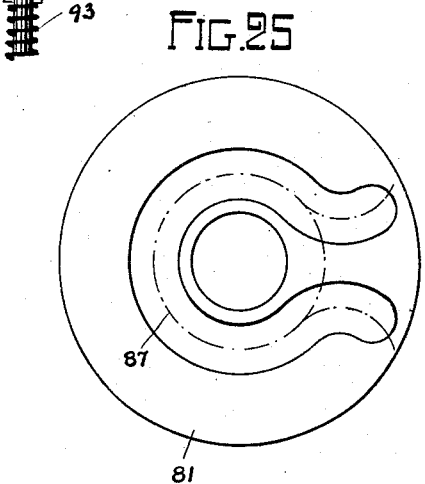

Referring now to the drawings hereunto annexed for a detailed description of my invention: Figure 1 is a longitudinal section of a clutch connecting a shaft and a pulley, the parts being shown in the position they are when the clutch is thrown in. Fig. 2 is a similar section of the same mechanism showing the parts in their positions when the clutch is thrown out of gear. Fig. 3 is an end view of the clutch. Fig. 4 is an end view of the clutch block shown in detail. Fig. 5 is a side elevation of the clutch block. Figs. 6 and 7 are side and end views respectively of a clutch crank. Fig. 8 is a front view of the clutch race. Fig. 9 is a sectional plan of a reverse gear for automobiles furnished with a number of clutches embodying the principle of my invention. Fig. 10 is an end view of one of the clutches shown in Fig. 9. Fig. 11 is a diagram illustrating the action of the clutch race in turning the clutch cranks. Figs. 12 to 21 are diagrams showing the variation of the force acting upon the crank pin required to counterbalance the action of the spring upon the crank body. Fig. 22 is a longitudinal section through a driving pulley carried on a shaft of a press and furnished with a clutch of my invention. Fig. 23 is an end view of the clutch block. Fig. 24 is an end view of the clutch race carried by the pulley or fly wheel and Fig. 25 is an end view of the stationary race carried by the frame of the press.

In the construction shown in Figs. 1 to 8 the clutch is placed between the shaft 1 and the pulley 2. The shaft may represent the driving member and the pulley the driven member or vice versa, the pulley the driving member and the shaft the driven. The clutch and pulley are shown to be formed in halves and bolted together, so that they may be easily placed anywhere along the shaft, but the splitting of the said parts is not for the successful working of the device. The pulley is mounted upon a sleeve 3, also formed in two halves held together from the outside by the hub of the pulley. The sleeve carries the flange 4 upon which is secured the clutch race 5. A lining 6 is placed inside the sleeve to form a bearing for the pulley, and a collar 39 is secured to the shaft in order to keep the pulley in place. The pulley is free to turn on the shaft. A clutch block 7 (shown in detail in Figs. 4 and 5) is rigidly keyed to the shaft 1 and is provided with a seat 8 to receive the stem 9 of the clutch crank, and with a guiding hole 30 to receive the guiding pin 31 of the clutch shifting sleeve. The crank which is shown in detail in Figs. 6 and 7 consists of the crank body 10 carrying at one end the hollow stem 9, whereby it becomes pivoted to the clutch block 7, and at the other end a boss provided with the bore 11 to receive the sliding crank pin 12. A portion of the clutch block is cut away at 13 to make room for the crank body 10. In assembling the clutch block the stem 9 of the crank is placed inside the seat 8 and is locked in place by introducing through a hole 14 a number of balls 15 which enter an annular race formed by the annular groove 17 cut in the outer surface of the stem 9 of the crank and by the annular groove 18 cut in the seat 8; the hole 14 is then closed by the screw plug 19. The outer face of the crank body 10 will then be flush with the face of the hub of the clutch block. The crank is free to move within the cut away portion 13 for more than half a turn. Within the hollow interior of the stem 9 is placed a plug which is made in the form of a bobbin by having the middle portion reduced in diameter to form the stem 21, and leaving at the ends the flanges 22; one of said flanges is fitted in the interior bore 23 of the stem 9 and the other flange projecting beyond the stem 9 enters the reduced bore 24 in the clutch block 7 and becomes secured by a pin. A flat spiral spring 25 shown in Fig. 10 is secured at one end to the stem 21 of the bobbin while at the other end it is fastened to a strip 26, which is fitted to slide in a groove 27 cut in the interior bore 23 of the stem 9. While the bobbin is being introduced into the bore 23 of the stem 9, the strip 26 is made to slide in the groove 27 until it comes flush with the end of said stem. One end of the spring 25 is thus made secure to the crank stem 9 and the other end is held by the stem of the bobbin. The spring is wound up by turning the bobbin to the desired extent and securing it to the clutch block 7 by the pin 28. The spring will keep the crank body normally in the position shown in Fig. 3 where it is resting against stop 29, the crank pin being at its normal distance from the center of the shaft lying on the dotted circle 40. The shaft 1 is fitted with a shifting sleeve 32 which is formed integral with the plate 33 carrying at one end the cylindrical casing 34 and at the other end the guiding pin 31 which is fitted to slide in the guiding hole 30 in the clutch block 7. The center of the cylindrical casing 34 comes in alinement with the center of the seat 8 in the clutch block. A flange 35 carried by the cylindrical casing is fitted to engage an annular groove 36 cut in the crank pin 12. The crank pin will thus remain engaged by the concentric flange 36 at all positions of the crank, and by shifting the sleeve 32 along the shaft to the left as shown in Fig. 1, or to the right as shown in Fig. 2, the crank pin 12 may be made to slide inside the bore 11 accordingly, causing the said pin to extend beyond the face of the crank body so as to enter the clutch race 5 carried by the pulley and engage the latter, or causing the said crank pin to be withdrawn from the race in order to disengage the pulley. The clutch race 5 is here shown to be formed of a cam plate 37 and two pins 38 which are secured to the flange 4 of the sleeve 3 carried by the pulley. The pins 38 are placed at the center of curvature of the outer portion of the outline of the cam plate 37, leaving a space 5 between to form the actuating portion of the race. The crank pin 12 is free to enter the race 5 during the greater portion of the revolution. The sleeve 32 is operated by a shifting lever 16 which is connected to it in the usual manner.

Fig. 9 illustrates a reverse gear of an automobile provided with two clutches showing my invention with some modifications of detail. 41 is a casing which is provided with proper bearings to support the short driving shaft 42, the counter shaft 43 and the driven shaft 44. The driving shaft 42 is provided at one end with a thread 45 whereby it may be connected to an engine and at the other end it carries a head 46 upon which is driven on a pinion 47 formed integral with the clutch race body 75. Within the hollow of the head 46 is placed the bearing 49 supporting the end of the driven shaft 44. The pinion 47 engaging the teeth of the gear 50, which is keyed to the counter shaft 43, drives the said counter shaft at a constant rate of speed. A number of driving gears 51, 52 and 53, are keyed to the counter shaft and are made to engage the gears 54, 55 and 56 which are mounted loosely upon the driven shaft 44 and carry the clutch races 5. The gears 51 and 52 connect directly with the gears 54 and 55 while the gear 53 engages the gear 56 by means of an intermediate gear 57 carried on a stationary pin 48, and drives the gear 56 in the opposite direction to that of the gears 47, 54 and 55. Two clutch blocks 58 are placed on the driven shaft 44, one between the clutch race carried by the pinion 47 and a similar clutch race carried by the gear 54 and the other between the clutch races carried by the gears 55 and 56. The clutch blocks 58, shown in an enlarged end view in Fig. 10 and in side elevation and longitudinal section in Fig. 9, consist of circular disks bored and fitted to slide upon the shaft and provided with key ways 59 engaging the feathers 60 carried by the shaft. Four circular seats 61—61 and 62—62 are bored in the clutch blocks 58 to receive the eccentric bodies 63—63 and 64—64. The seats 61—61 carrying the eccentric bodies 63—63 are drilled from the opposite direction to that of the seats 62—62 which carry the eccentric bodies 64—64. The eccentric bodies are made hollow and are provided with the eccentric pins 66; they are held in place by the screws 67, which engage grooves 68 cut on their outer surfaces. Within the hollow 23 of the eccentric bodies are placed plugs which are of the same construction as those described above, being in the form of a bobbin with a reduced middle portion forming the stem 21 and with the flanges 22 forming the ends. One of said flanges is made to fit the inside bore 23 of the eccentric body and the other flange is secured in the reduced bore 24 in the clutch block, where it becomes secured by a pin. A flat spring secured at one end to the stem 21 of the bobbin which is held rigid in the clutch block and at the other end to a strip 26 carried by the interior bore 23 of the eccentric body is used to keep the said body in the proper position, resting normally with the end of the groove 68 against the pin 67, thus determining the distance of the eccentric pin from the center of the shaft. The clutch block 58, thus constructed, is capable of engaging either one of the clutch races between which it is placed. The clutch body 58, shown to the right in Fig. 9, may be made to engage the clutch race 5 carried by the pinion 47 if shifted along the shaft toward the right, or it may be made to engage the clutch race carried by the gear 54 when shifted toward the left; and may be made to remain idle if brought to the middle position shown in the figure. The number of grooves constituting the clutch races carried by the gears 47, 54, 55 and 56 are two in each gear corresponding with the number of eccentric pins engaging the said gears.

The clutch block 58 shown to the left in Fig. 9 may be made to engage either the clutch race carried by the gear 55 or the one carried by the gear 56 according to whether it is shifted toward the one or toward the other. For shifting the clutch blocks along the driven shafts 44, shifting sleeves 69 carrying the operating lugs 70 are fitted to slide upon the guiding rods 71 and are furnished with the engaging flanges 72 which are fitted in annular grooves 73 cut on the outer cylindrical surface of said clutch blocks. The several sets of gears connecting the counter shaft 43 with the driving shaft 42 and with the driven shaft 44 are of different ratios in order to obtain a variety of rates of speed for the gears carrying the clutch races 5, thus making it possible to obtain a variation of speeds for the driven shaft by coupling a clutch block carried by the shaft with any one of the clutch races which is running with the desired rate of speed.

Figs. 22, 23, 24 and 25 illustrate the application of a clutch to a press. In Fig. 22 a loose fly wheel 76 driven by a belt 77 is mounted upon the shaft 20 of the press. A clutch race body 78 is secured to the fly wheel and a clutch race body 81 is rigidly secured to the stationary frame 79 of the press close to the bearing 80. A clutch block 82 is slidably fitted upon the shaft of the press and is held from turning by a feather. The clutch block carries three cranks 83 which are mounted in proper seats equally spaced upon a crank circle. The cranks 83 are all fitted in the side of the clutch block facing the fly wheel. Three separate clutch races 85 equally spaced are cut in the clutch race body 78 to correspond with the number of cranks 83 carried by the clutch block. The cranks are provided with spiral springs which are secured to plugs held rigidly in the clutch block in the same manner as those shown in Figs. 1 and 10, and which are intended to hold the cranks normally resting against the stops 86 bringing the crank pins 84 to be on the crank pin circle 87. The clutch races shown in Fig. 24 are formed of the concentric portions 88 and the portions 89 which are curved toward a radial direction. The radius of the concentric portion of the race is the same as that of the crank circle 87. When the clutch block 82 is shifted toward the fly wheel the three crank pins 84 enter the concentric portion of the clutch races, which moving together with the fly wheel, engage by their curved portions the said crank pins and operate so as to turn the cranks against the action of the springs and finally carry them along on their travel causing the rotation of the shaft. A side cam 90 is formed on the outer surface of the clutch block 82 which engages a roller 91, carried at the end of one arm 92 of a bell crank lever which is pivoted to the frame of the press. A spring 93 acting upon the other arm 94 of the bell crank keeps the roller in engagement with the side cam. To actuate the clutch block 82, the arm 94 of the bell crank is pulled downward, until the roller 91 clears the side cam 90, and is then released to be forced back by the action of the spring 93. The clutch block 82 will be forced to the left by the spring 95, the crank pins 84 will engage the clutch races, and the shaft 20 of the press will begin to turn, coming to a stop when the clutch block 82 will be shifted back away from the fly wheel by the roller 91 coming in contact with the inclined portion of the side cam 90. For stopping the momentum of the shaft after the crank pins 84 have been withdrawn from the clutch races 78 carried by the fly wheel, a crank 96 is fitted in a seat 97 drilled in the side of the clutch block facing the frame of the press and is adapted to engage a stationary clutch race 81 which is shown in detail in Fig. 25, and which is secured to the frame of the press. The crank 96 is also fitted with a spiral spring arranged to keep the said crank yieldingly against a stop. The side cam 90 is so proportioned as to slide the clutch block 82 far enough to cause the crank pin 98 of the crank 96 to enter the clutch race 81 after the crank pins 84 of the cranks 83 have been withdrawn from the clutch race 87. The stationary clutch race engaging the yielding crank 96 will bring the revolving shaft to a stop.

The several modifications of the clutch shown embody the same principle of operation, namely: a clutch race having a concentric portion and an eccentric portion curved toward a radial direction and carried by one of the members to be coupled together is made to engage a crank pin carried by the other member. The action of the race upon the crank pin is the same in all the modifications and the description of said action in a single case will apply to all of them.

Referring to Fig. 10, the eccentric bodies 64—64 carrying the eccentric pins 66 are shown in the position they normally occupy when disengaged, while the bodies 63—63 carrying the eccentric pins 66 are in the position they occupy when engaged by the clutch races 5. The action of the crank pin race upon an eccentric or upon a crank is illustrated diagrammatically in Fig. 11, while the effect of such action in reducing the shock due to the sudden starting or sudden stopping of the driven mass is best explained by the same diagram with the additional diagrams of Fig. 12 to Fig. 21 inclusive. In the figures 0 represents the center of the driven shaft 44 around which the clutch blocks 58 are turning; the centers of the eccentric bodies are traveling along the circle 75, and the centers of the eccentric pins are moving normally along the circle 40, which is of the same radius as that of the concentric portion of the clutch race. The eccentric pins 66 enter the clutch races 5 while moving along the said concentric portion and they remain idle until they reach the beginning of the eccentric part of the race, when the center of the eccentric pin will be at $c$, and the center of the eccentric body at C. The line $cC$ joining the two centers represents the eccentricity or the length and the direction of the crank formed by the eccentric. The center of the eccentric body is moving successively with a uniform rate of speed through the points $C^1$, $C^2$, $C^3$, $C^4$, $C^5$, $C^6$, $C^7$ and $C^8$, causing the center of the eccentric pin to take corresponding positions at the points $c$, $c^1$, $c^2$, $c^3$, $c^4$, $c^5$, $c^6$, $c^7$ and $c^8$. The direction of the crank line will successively change to $C^1$—$c^1$, $C^2$—$c^2$, $C^3$—$c^3$, $C^4$—$c^4$, $C^5$—$c^5$, $C^6$—$c^6$, $C^7$—$c^7$ and $C^8$—$c^8$. The angle through which the crank line $C$—$c$ will turn is determined by the difference of the reflex angle $c^8C^80$ and the angle $cC0$. The resistance of the spring to the turning of the crank line $C$—$c$ remains practically uniform, due to its great length and to the considerable initial tension given to it; while the force acting upon the crank pin and tending to counterbalance the action of the spring has to vary greatly, due to the great variation in the length of the lever arm at the different inclinations of the crank.

Figs. 12 to 21 show diagrammatically the variable forces required to be applied to the eccentric pins in the direction of their motion around the center O of the shaft in order to counterbalance the action of the spring when the eccentric pins are in the several positions $c$, $c^1$, $c^2$, $c^3$, $c^4$, $c^5$, $c^6$, $c^7$, shown in Fig. 11 and in the additional positions $c^9$ and $c^{10}$ shown in Figs. 20 and 21. The centers of the eccentric body are designated by the corresponding letters C, $C^1$, $C^2$, $C^3$, $C^4$, $C^5$, $C^6$, $C^7$, $C^9$ and $C^{10}$ and the lines C—$c$, $C^1$—$c^1$, $C^2$—$c^2$, $C^3$—$c^3$, $C^4$—$c^4$, $C^5$—$c^5$, $C^6$—$c^6$, $C^7$—$c^7$, $C^9$—$c^9$, and $C^{10}$—$c^{10}$ joining the centers of the eccentric body and the center of the eccentric pin represent the length and the position of the crank formed by the eccentric. The force of the spring acting at right angles to the crank is supposed to be constant at all the positions of the crank and is represented by the length of the lines $c$—$f$, $c^1$—$f^1$, $c^2$—$f^2$, $c^3$—$f^3$, $c^4$—$f^4$, $c^5$—$f^5$, $c^6$—$f^6$, $c^7$—$f^7$, $c^9$—$f^9$, and $c^{10}$—$f^{10}$. The moment of the constant force of the spring acting upon a lever arm of constant length is constant, and this constant moment is equal in each case shown in the diagrams to the moment of the pressure of the clutch race represented by the lines $g$—$c$, $g^1$—$c^1$, $g^2$—$c^2$, $g^3$—$c^3$, $g^4$—$c^4$, $g^5$—$c^5$, $g^6$—$c^6$, $g^7$—$c^7$, $g^9$—$c^9$ and $g^{10}$—$c^{10}$ upon the eccentric pin acting upon a variable lever arm. The lines $k^1$ $c^1$, $k^2$ $c^2$, $k^3$ $c^3$, $k^4$ $c^4$, $k^5$ $c^5$, $k^6$ $c^6$, $k^7$ $c^7$, $k^9$ $c^9$ and $k^{10}$ $c^{10}$ represent the component part of the pressure of the race acting in the direction of the motion of the eccentric pin around the center O of the shaft. This force varies in the several diagrams being 0 in Fig. 12 and increases gradually up to Fig. 15 when it begins to decrease slightly and becomes a minimum in Fig. 18, whence it again begins to increase and in Fig. 21 it is equal to the length of the line $k^{10}$ $c^{10}$. In the position showing the crank pin in Fig. 11 to be on line $C^8$—$c^8$ where it passes through the center $h$ of the eccentric part of the clutch race, the force required to counterbalance the action of the spring is infinity. When the fly wheel is turned by hand in the opposite direction, for one or more turns, (as it is the case in a press when something becomes caught and the machine has to be backed up), the eccentric pin engages the other end of the clutch race at the concentric portion. The free motion of the eccentric pin for a considerable angle inside the clutch race will permit the use of the fly wheel as a ram in order to force the shaft back.

Having thus described my invention, what

I claim as new and desire to secure by Letters Patent is:

1. In a positive clutch a clutch race arranged to turn together with one member, a crank fitted to turn in a seat carried by the other member and arranged to rest against a stop, a spring adapted to hold the said crank yieldingly against the said stop, a crank pin carried by said crank adapted to move at one time toward said race in order to engage it and at another time away from said race in order to disengage it, and means for moving the said crank pin.

2. In a positive clutch a clutch race comprising a concentric portion and an eccentric portion carried by one member, a crank fitted to turn in a seat carried by the other member and adapted to rest against a stop, a spring acting to hold the said crank yieldingly against the staid stop, a crank pin carried by the said crank adapted to move at one time toward the said race, enter the concentric portion, and becoming engaged by the eccentric portion, move so as to turn the crank inside the seat, and at another time to move away from said race in order to disengage it, and means for moving the said crank pin.

3. In a positive clutch a clutch race comprising a concentric portion and an eccentric portion carried by one member, a crank fitted to turn in a seat and held yieldingly by a spring against a stop carried by the other member, and means adapted to bring the said clutch race and the said crank together causing the said race to engage the crank pin and thus turn the crank against the action of the spring.

4. In a positive clutch a clutch race comprising a concentric portion and an eccentric portion carried by one member, a crank fitted to turn in a seat carried by the other member and adapted to rest against a stop, a spiral spring secured at one end to said crank and at the other to the said other member, placed to hold the said crank against said stop, and means adapted to bring the said crank and the said race together in order to cause the said race to engage the crank pin, thus turning the crank against the action of the spring.

GEORGE A. PETERSON.

Witnesses:
JAMES PARKER,
L. ST. D. ROYLANCE.

Copies of this patent may be obtained for five cents each, by addressing the "Commissioner of Patents, Washington, D. C."